(12) United States Patent
Twigg et al.

(10) Patent No.: US 6,775,972 B2
(45) Date of Patent: Aug. 17, 2004

(54) PURIFICATION OF EXHAUST GASES

(75) Inventors: Martyn Vincent Twigg, Caxton (GB); Ian Carmichael Wishart, Aston Tirrold (GB)

(73) Assignee: Johnson Matthey Public Limited Company, London (GB)

(\*) Notice: Subject to any disclaimer, the term of this patent is extended or adjusted under 35 U.S.C. 154(b) by 0 days.

(21) Appl. No.: 10/305,665

(22) Filed: Nov. 27, 2002

(65) Prior Publication Data

US 2003/0140616 A1 Jul. 31, 2003

Related U.S. Application Data

(63) Continuation-in-part of application No. 09/806,118, filed on Mar. 29, 2001, now Pat. No. 6,557,340.

(51) Int. Cl.[7] ............................................. F01N 3/00
(52) U.S. Cl. ........................... 60/275; 60/295; 60/311
(58) Field of Search ......................... 60/274, 275, 301, 60/311; 422/186.03, 186.04; 204/164

(56) References Cited

U.S. PATENT DOCUMENTS

| | | |
|---|---|---|
| 4,902,487 A | 2/1990 | Cooper et al. |
| 5,423,180 A | 6/1995 | Nobue et al. |
| 5,423,904 A | 6/1995 | Dasgupta |
| 5,705,131 A | 1/1998 | Rutland |
| 5,711,147 A | 1/1998 | Vogtlin et al. |
| 5,767,470 A \* | 6/1998 | Cha ........................ 204/157.3 |
| 5,807,466 A | 9/1998 | Wang et al. |
| 5,822,981 A | 10/1998 | Williamson et al. |
| 6,038,853 A | 3/2000 | Penetrante et al. |
| 6,038,854 A | 3/2000 | Penetrante et al. |
| 6,047,543 A | 4/2000 | Caren et al. |
| 6,185,930 B1 | 2/2001 | Lepperhoff et al. |
| 6,321,531 B1 \* | 11/2001 | Caren et al. ................... 60/275 |
| 6,475,350 B2 \* | 11/2002 | Palekar et al. ............... 204/164 |
| 6,479,023 B1 \* | 11/2002 | Evans et al. ........... 422/186.04 |
| 6,546,717 B1 \* | 4/2003 | Chandler et al. ............. 60/274 |

FOREIGN PATENT DOCUMENTS

| | | |
|---|---|---|
| DE | 196 45 689 | 5/1998 |
| DE | 198 26 831 | 10/1999 |
| EP | 0 341 832 | 11/1989 |
| EP | 0 758 713 | 2/1997 |

OTHER PUBLICATIONS

Gieshoff, J. et al., "Improved SCR Systems for Heavy Duty Applications," SAE Technical Paper Series, No. 200-01-0189. ©2000 Society of Automotive Engineers, Inc.

\* cited by examiner

Primary Examiner—Thomas Denion
Assistant Examiner—Diem Tran
(74) Attorney, Agent, or Firm—RatnerPrestia

(57) ABSTRACT

A system for treating exhaust gases including NO, nitrogen and particulate matter comprises: a catalyst for generating $NO_2$ from the NO; a plasma generator for generating at least one of: (1) $NO_2$ from the NO or nitrogen or both; and (2) ozone; and a filter for trapping a desired proportion of the particulate matter which is combusted with at least one of $NO_2$ or ozone. Methods for increasing levels of $NO_2$ in an exhaust system to combust trapped particulate matter involve oxidising NO to $NO_2$ over an oxidation catalyst at an optimum temperature range and using a plasma generator to generate $NO_2$ from NO or $N_2$. Reducing exhaust gas emissions is achieved by trapping the particulate matter and combusting it by reaction with $NO_2$.

35 Claims, 2 Drawing Sheets

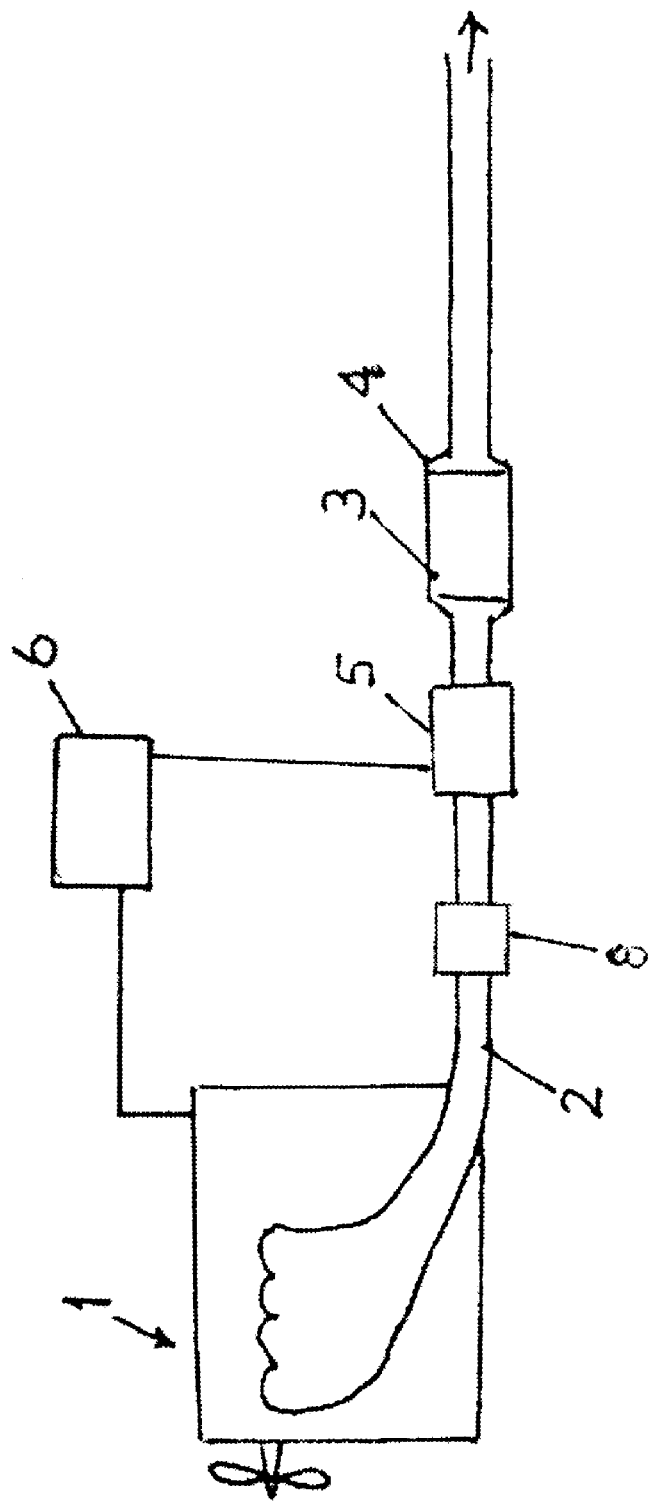

PURIFICATION OF EXHAUST GASES

This application is a continuation-in-part of U.S. patent application Ser. No. 09/806,118, which is a U.S. national phase application of PCT International Application No. PCT/GB99/03102, and claims priority of British Patent Application No. 9821947.0.

This invention concerns the purification of exhaust gases, especially the purification of such gases from diesel and other "lean-burn" engines.

BACKGROUND OF THE INVENTION

Diesel engines are in widespread use in all types of vehicles, stationary power sources and naval and commercial shipping. They are very fuel-efficient, but because of their combustion characteristics generate particulate matter (soot, often called "PM") on which a variety of organic substances may be absorbed, including unburnt hydrocarbons (HC) and sulphuric acid produced by oxidation of sulphur dioxide derived from sulphur species present in the fuel or in lubricants. Other engines, such as gasoline direct injection ("GDI"), can also produce significant quantities of PM, and we consider that the need for removing such PM will soon be expressed in legislation. Nonetheless, the invention may be applied to combustion processes generally, as well as potentially to chemical process stacks/exhausts, and to combustion engines operating at $\lambda=1$ or greater, or lean-burn engines operating at stoichiometric or rich in order to regenerate some exhaust gas aftertreatment device. For simplicity, however, we concentrate on diesel engines hereinafter.

BRIEF SUMMARY OF THE INVENTION

In order to meet various regulations concerning the level of pollutants, it has become commonplace to fit vehicles with an oxidation or three-way catalyst, which only achieves partial removal of PM. The removal of particulates is generally achieved by using some form of filter or trap, which may be cleaned or regenerated intermittently. It has been suggested to include a catalyst in the fuel to the engine, and as well as platinum group metals ("PGMs"), iron, copper or cerium compounds have been suggested. A particulate trap may be catalysed to lower the soot combustion temperature, and some form of external heating, for example electric heating of the trap or of air fed thereto, may be used to initiate soot combustion.

A particularly successful soot trap is marketed by Johnson Matthey PLC as the "CRT" ("Continuously Regenerating Technology") and is described in U.S. Pat. No. 4,902,487. This system uses a conversion of NO in the exhaust gas to $NO_2$, which was discovered to be much more effective at typical low diesel exhaust gas temperatures in the combustion of soot than air or any other exhaust gas component. Thus, $NO_2$ is typically effective to combust PM at about 250° C., whereas oxygen is effective at about 650° C.

It has been suggested to use a plasma generator for exhaust gas purification (see for example GB 2,274,412 and 2 270 013, UK Atomic Energy Authority). Although it was probably not previously recognised in connection with exhaust gas treatment, such a system produces considerable quantities of $NO_2$. Systems such as previously described do not include any filter or trap in combination with a plasma generator, but we believe that this may be a particularly effective system for treating diesel and similar lean-burn exhaust gases.

Accordingly, the present invention provides a system for treating exhaust gases including NO, nitrogen and particulate matter, which system comprising:

(a) a catalyst for generating $NO_2$ from the NO;
(b) a plasma generator for generating at least one of: (1) $NO_2$ from the NO or nitrogen or both; and (2) ozone; and
(c) a filter for trapping a desired proportion of the particulate matter, wherein trapped particulate matter is combusted by reaction with at least one of $NO_2$ or ozone. In an illustrative embodiment, the exhaust gases are from a diesel engine.

We believe, although we do not wish to be bound by any theory, that in the present invention $NO_2$ may be generated not only by oxidation of NO in the exhaust gases, but also by oxidation of nitrogen to yield NO, which is itself converted to $NO_2$. In the latter case, there is no reliance upon the quantities of NOx leaving the engine. It is also believed that the present invention is especially valuable in that it is not adversely affected by the presence of sulphur in the fuel or in lubricants, which can poison conventional catalysts.

The invention further provides a method of reducing exhaust gas emissions from diesel engines, comprising oxidising NO in the exhaust gas to $NO_2$ over an oxidation catalyst at oxidation catalyst temperatures within an optimum oxidation catalyst temperature range and using a plasma generator to generate $NO_2$ from NO or $N_2$ in the exhaust gas or both at oxidation catalyst temperatures outside of the optimum oxidation catalyst temperature range, trapping particulate matter on a filter and combusting the trapped particulate matter by reaction with $NO_2$.

In a further aspect, the invention provides a method of maintaining increased levels of $NO_2$ in diesel exhaust gas over exhaust gas emitted from the engine independent of exhaust gas temperature, which $NO_2$ is for combusting particulate matter filtered from the exhaust gas, which method comprising oxidising NO in the exhaust gas to $NO_2$ at an oxidation catalyst temperature within an optimum oxidation catalyst temperature range and using a plasma generator to generate $NO_2$ from NO or N2 in the exhaust gas or both at oxidation catalyst temperatures outside of the optimum oxidation catalyst temperature range.

In yet a further aspect, the invention provides a method of increasing levels of $NO_2$ in an exhaust system to combust particulate matter trapped on a filter in the system, which system includes an oxidation catalyst effective to oxidise NO to $NO_2$ over an optimum oxidation catalyst temperature. The method according to this aspect comprises using a plasma generator to generate additional $NO_2$ from one or both of NO and $N_2$ during engine conditions which are pre-determined to generate increased amounts of particulate matter even when the oxidation catalyst temperature is within the optimum oxidation catalyst temperature range.

The oxidation catalyst can be any catalyst suitable for oxidising NO to $NO_2$ in the presence of oxygen. Typical catalysts for this reaction include platinum on alumina or silica-alumina. The loading of the platinum can be between 0.5 to 200 g $ft^{-3}$, such as 50 g $ft^{-3}$. A washcoat of the platinum and the alumina support can be coated on a ceramic, e.g. cordierite, substrate of 100–600 cells per square inch (cpsi), typically 400 cpsi. Alternatively a metal substrate can be used, in which case typical cpsi values can be up to 1000. The oxidation catalyst can be positioned to treat all or a portion of the exhaust gases upstream of the filter, or may be fitted downstream of the filter to treat all or a portion of the filtered exhaust gas, with recirculation of the treated gas to the filter. The oxidation catalyst can be positioned upstream or downstream of the plasma generator.

The plasma generator may be any suitable type producing a non-thermal plasma, and may be enhanced by electromagnetic radiation. Suitable plasma generators include high voltage (e.g. 20 kV or more) alternating current, preferably pulsed, generators, suitably using two dielectric plates positioned in the gas flow, and piezoelectric devices such as piezoceramic transformers. It may be positioned to treat all or a portion of the exhaust gases upstream of the filter, or may be fitted downstream of the filter to treat all or a portion of the filtered exhaust gas, with recirculation of plasma-treated gases to the filter. In one embodiment of the present invention, a predetermined proportion of the exhaust gases is treated by the plasma to cause substantially all of the NO present to be converted into $NO_2$, and the resulting gases blended with untreated exhaust gases, thus resulting in a desired blend of NO and $NO_2$, which according to some studies, may be more effective for the purposes of the present invention than a gas containing substantially only $NO_2$ in admixture with other exhaust gas components.

The filter used may be a woven or knitted wire filter, a gas-permeable metal or ceramic foamed mass or a wall flow filter of generally known type (honeycomb monolith). For certain vehicles, especially light cars or vans, it may be necessary or desirable, to use a filter design which collects only 80% or so by weight of the total soot particulates and preferably incorporates a by-pass and/or pressure relief valve. The filter may be partially or completely catalysed if desired. A catalysed trap may improve the aggregate removal of pollutants.

An embodiment of the present invention incorporates a means for removing NOx downstream of the filter and plasma generator. Such means may be a NOx trap, which technology is available to the skilled person, and generally includes one or more alkali earth metal compounds, especially calcium oxide or barium oxide, or alkali metal, carried on a metal or ceramic honeycomb-type support. The NOx trap is desirably used in combination with a lean-NOx catalyst. Another means for removing NOx is Selective Catalytic Reduction ("SCR"), which is well established for stationary power sources and is receiving increasing attention for vehicular applications. Such a modified system can be effective to meet all current and known future emission control regulations for diesel and like engines.

The plasma generator may be controlled and actuated by an engine management unit, or other microprocessor control unit, to operate intermittently according to certain engine operating conditions (speed, load etc.) which have been pre-determined to generate more soot. The identification of such operating conditions can be readily accomplished by one skilled in the art, and such conditions include times when the emission of particulate matter would be undesirably high in the absence of any treatment therefor.

In one embodiment, the plasma generator is controlled, e.g. by a pre-programmed microprocessor unit in an engine management means, to operate when exhaust gas temperatures are too low for the NO oxidation catalyst to work effectively to produce sufficient $NO_2$ to combust soot on the filter. That is, when the kinetics of the $NO+\frac{1}{2}O_2 \rightarrow NO_2$ reaction is limited by temperature.

In addition, or in the alternative, the plasma generator can be controlled to operate at higher temperatures, when the $NO/NO_2$ shift is constrained thermodynamically. That is, increasing the temperature leads to a decrease in NO conversion because the reverse of the reaction $NO+\frac{1}{2}O_2 \rightarrow NO_2$ is competing with the forward reaction.

The temperature range defined by these two limits can be viewed as "an optimum oxidation catalyst temperature range." The specific value of this range will depend on a number of factors, such as the type and loading of catalyst and the content of the exhaust gas, and can readily be determined empirically. For many systems, the optimum oxidation catalyst temperature range is approximately 200–400° C., preferably 250–350° C. in many cases, and this temperature range is often the temperature of the oxidation catalyst during normal operating conditions. Thus, $NO_2$ can be generated by the NO oxidation catalyst during normal operating conditions, e.g. 200–400° C., especially 250–350° C. (during which time the plasma generator is switched off) and can be generated by the plasma generator during periods of low or high exhaust gas temperatures at the oxidation catalyst, or both. Alternatively, the plasma generator can be operated to generate additional $NO_2$ during engine conditions which generate increased amounts of particulate matter regardless of whether the oxidation catalyst temperature is within or outside of its temperature range.

In each of these circumstances, plasma generated $NO_2$ can be used to maintain soot combustion outside of the normal operating window of the NO oxidation catalyst, and increase the temperature range of application for soot regeneration by combustion in $NO_2$.

Alternatively, the plasma generator may operate during all operational conditions of the engine, which system has the benefit of simplicity, but this may be undesirable if the engine is in an operating condition in which significant quantities of NOx are generated, or during regeneration of a NOx trap.

The present invention, at least in its most preferred embodiments, in addition to being particularly effective at controlling emissions, permits the engine designers to design and tune the engine for power and/or fuel efficiency, rather than being forced to make compromises in engine design to minimise the generation of NOx and particulates. This can be a significant advantage for commercial vehicles, but allows flexibility in design for all engines and types of vehicles.

Yet another embodiment of the present invention is to feed a reductant, which term includes hydrocarbon fuel, e.g. diesel fuel, ammonia, ammonia precursors, hydrogen etc. into the exhaust gases either upstream or downstream of the plasma generator.

BRIEF SUMMARY OF THE DRAWINGS

The present invention is illustrated with reference to the accompanying drawings, in which:

FIG. 2 is a schematic diagram of a further system according to the invention.

DETAILED DESCRIPTION OF THE DRAWINGS

Figure 1:
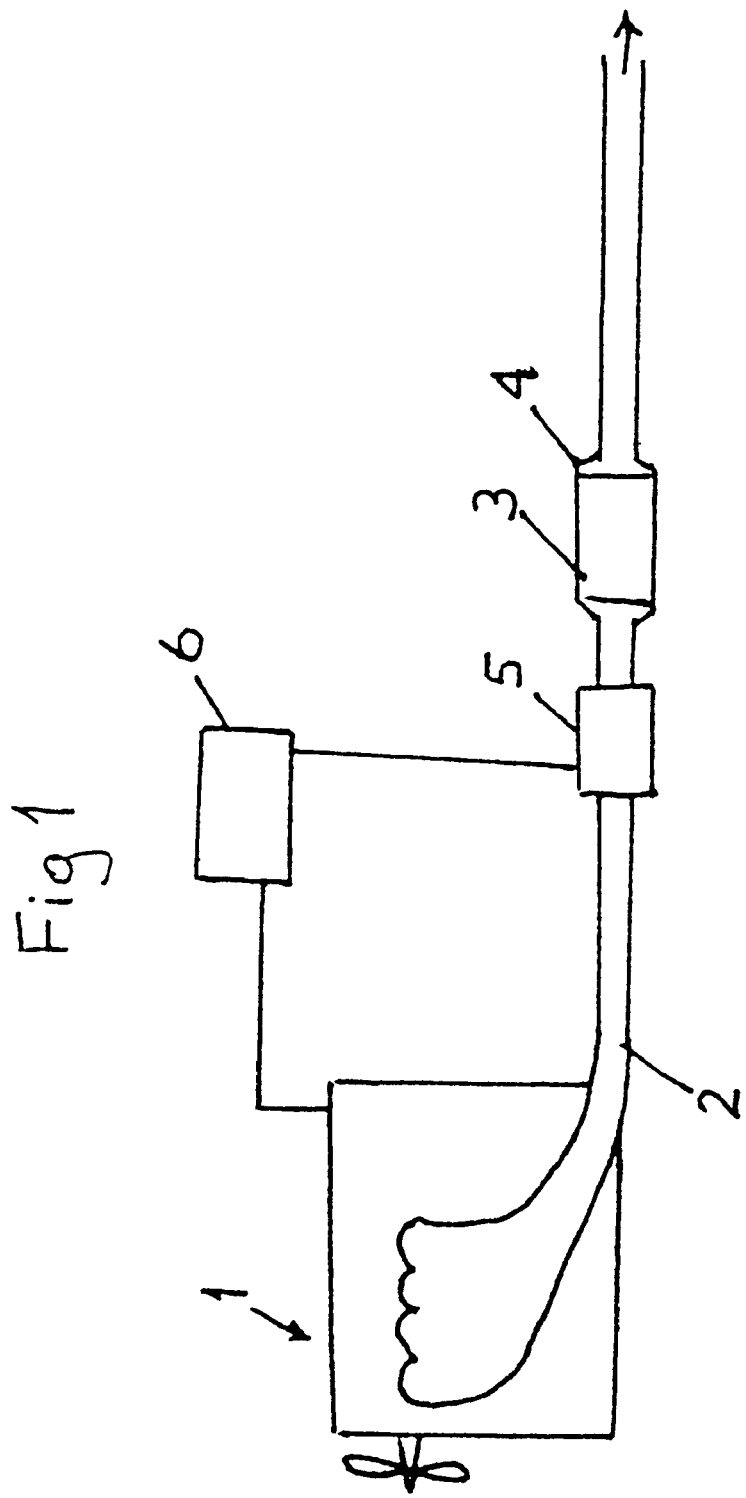
FIG. 1 is a schematic diagram of a system including features according to the invention.

In FIG. 1, a diesel engine is shown at 1, and has an exhaust system, 2. Conventional silencer boxes and ancillary equipment are not shown. A wall flow filter, 3, retained within a metal box, 4, is mounted in the exhaust system. Mounted close upstream to the filter, is a plasma generator, 5, which is operated according to signals from the engine management unit, 6.

Although not wishing to be held to a particular theory, indications are that substantially all soot particles trapped on the filter are removed continuously, although there are variations in soot build up and removal rates. $NO_2$ and ozone have been detected in the exhaust gases after the plasma generator, with substantially lower levels after the filter.

The embodiment in FIG. 2 is based on the embodiment in FIG. 1 and the reference numerals used have the same meaning as in FIG. 1. In addition to the elements of the embodiment in FIG. 1, the FIG. 2 embodiment includes an oxidation catalyst 8 disposed upstream of plasma generator 5 for oxidising NO to $NO_2$. The oxidation catalyst comprises platinum supported on particulate high surface area alumina at 50 gft$^{-3}$ and is coated on a 400 cpsi cordierite monolith.

The following Examples illustrate features of the present invention. It is known from U.S. Pat. No. 4,902,487 (incorporated herein by reference) that NO can be oxidised in the presence of oxygen to $NO_2$ over a suitable oxidation catalyst. Given the present disclosure, one skilled in the art can readily integrate the teaching of that patent and the Examples which follow to show the principle of operation of a system including both a plasma generator and a NO oxidation catalyst. In particular, one skilled in the art can readily develop an exhaust system wherein the plasma generator is controlled to operate at oxidation catalyst temperatures below about 200° C. and above about 400° C. in addition to any NO oxidation by the oxidation catalyst.

EXAMPLE 1

The non-thermal plasma discharge generator used comprised a ceramic tube 10 cm long and 5 cm external diameter in which a bed of pelleted material of suitable dielectric constant was held between two circular stainless steel mesh electrodes. The mesh aperture size was about 0.5 mm. Typically the pellets were of size about 3 mm, and occupied a length of 1–3 cm in the ceramic tube. The packed volume was about 12–36 cm$^3$. One electrode was grounded via a large spring that maintained a physical pressure on the bed of pellets. The other electrode was fixed and connected to the 'live' side of a power supply capable of providing an adjustable AC voltage at 50 Hz up to 10 kV and powers of up to 1 kW.

A gas mixture designed to approximate key features of exhaust gas from a diesel engine containing nitric oxide (300 ppm), propene (300 ppm), oxygen (12%), and water vapour (about 1%) with the balance being helium was passed through the plasma generator at a flow rate of 250 ml min$^{-1}$. A mass spectrometer was used to determine and quantify the composition of gas exiting the generator. When operating at ambient temperature with a voltage of about 3 kV applied across the electrodes destruction of propene was almost 100%, and a large quantity of carbon dioxide was formed. However, the amount of carbon dioxide was only about 35% of that expected for complete combustion. Traces of formaldehyde were detected but carbon monoxide probably accounted for most of the other oxidation products. However, its quantification was complicated by traces of nitrogen having a similar mass number.

Nitric oxide was also completely removed when the potential was applied to the electrodes, and substantial levels of nitrogen dioxide (mass 46) were detected in the exit gas. The amount of nitrogen dioxide detected typically corresponded to about 55% of the amount of the original nitric oxide and depended on the nature of the pellets. With alumina pellets higher surface area material (e.g. 200 m$^2$g$^{-1}$) gave higher conversions than low surface area material (e.g. 5 m$^2$g$^{-1}$). Alumina pellets coated with a thin layer of barium titanate or lead titanate gave higher conversions than just pure alumina pellets. Increasing the voltage applied across the electrodes also increased conversion of nitric oxide to nitrogen dioxide. These experiments demonstrate nitric oxide is oxidised to nitrogen dioxide by passage through a non-thermal plasma even when hydrocarbon is present.

EXAMPLE 2

A cordierite wallflow filter (5.66 inch diameter, 6.0 inch long) having 100 cells inch$^{-2}$ and $17/1000$ inch thick walls was located in the exhaust pipe of a four cylinder 1.9 litre direct injection turbo charged Diesel engine that ran on fuel containing 350 ppm sulphur. The engine was operated at 1200 rpm with half load for 10 hours. The filter was then removed from the exhaust pipe and ground to a powder that was pressed into small granules (250–350 µm). A sample of these sooty black granules (0.05 g) was placed in a stainless steel tube (6 mm diameter) and held in place by two small loose plugs of quartz wool. The tube was connected to the exit of the plasma generator of Example 1, and the gas was heated to temperatures in the range of 150–300° C. by electrical heating tape before passing over the sample containing Diesel soot. Analysis of the gas once it had passed over the soot containing sample was achieved by a mass spectrometer. Increasing the temperature of the gas passing over the sample resulted in increasing amounts of carbon dioxide being formed, and increasing amounts of nitric oxide in the gas after the sample. After maintaining the sample temperature at about 240° C. for an hour the discharged granules had only a light grey colouration indicating that most of the soot had been removed by exposure to the plasma treated gas. This experiment shows that gas containing nitric oxide that has been oxidised in a non-thermal plasma generator oxidises Diesel soot at temperatures above about 150° C., and so such a device could be used to keep a Diesel particulate filter free of excess soot by continuously combusting soot, even at relatively low temperatures.

It will be appreciated that many variations may be made to the system as particularly described, without departing from the present inventive concept. In particular, the skilled person will appreciate that Example 2 above illustrates a practical method for removing soot from a filter even at the low temperatures met with many modern engine designs, particularly when operating at idle or under low load. This is a valuable contribution to the art.

What is claimed is:

1. A system for treating exhaust gases including NO, nitrogen and particulate matter, which system comprising:
   (a) a catalyst for generating $NO_2$ from the NO;
   (b) a plasma generator for generating at least one of: (1) $NO_2$ from the NO or nitrogen or both; and (2) ozone;
   (c) a filter for trapping a desired proportion of the particulate matter; and
   (d) a microprocessor for controlling the plasma generator to operate at exhaust gas temperatures over the oxidation catalyst of > about 400° C.,
wherein trapped particulate matter is combusted by reaction with at least one of $NO_2$ or ozone.

2. A system according to claim 1, wherein the microprocessor further operates during engine conditions which are pre-determined to generate increased amounts of particulate matter.

3. A system according to claim 1, wherein the microprocessor further operates during low exhaust gas temperatures.

4. A system according to claim 3, wherein the microprocessor operates when the exhaust gas temperature over the oxidation catalyst is about <200° C.

5. A system according to claim 1, wherein the plasma generator is located upstream of the filter and all or a portion of the exhaust gases from the engine are passed therethrough.

6. A system according to claim 1, wherein the plasma generator is located downstream of the filter and all or a portion of the plasma-treated and filtered exhaust gases are recirculated to the upstream side of the filter.

7. A system according to claim 1, wherein a proportion of the exhaust gases are plasma treated and blended with untreated exhaust gases to create a desired blend of NO and $NO_2$.

8. A system according to claim 1, further comprising means for removing or reducing NOx mounted downstream of the filter and plasma generator.

9. A system according to claim 8, wherein the means for removing or reducing NOx comprises a NOx trap.

10. A system according to claim 8, wherein the means for removing or reducing NOx comprises an SCR system.

11. A system according to claim 1, wherein the plasma generator comprises a piezoelectric device.

12. A system according to claim 1, wherein the microprocessor is comprised in an engine management unit.

13. A method of reducing exhaust gas emissions from lean burn engines, comprising oxidising NO in the exhaust gas to $NO_2$ over an oxidation catalyst at oxidation catalyst temperatures within an optimum oxidation catalyst temperature range and using a plasma generator to generate $NO_2$ from NO or $N_2$ in the exhaust gas or both at oxidation catalyst temperatures outside of the optimum oxidation catalyst temperature range trapping particulate matter on a filter and combusting the trapped particulate matter by reaction with $NO_2$.

14. A method according to claim 13, wherein the optimum oxidation catalyst temperature range is from about 200° C. to about 400° C.

15. The method of claim 13, wherein the lean burn engine is a diesel engine.

16. A method of maintaining increased levels of $NO_2$ in exhaust gas over exhaust gas emitted from a lean burn engine independent of exhaust gas temperature, which $NO_2$ is for combusting particulate matter filtered from the exhaust gas, which method comprising oxidising NO in the exhaust gas to $NO_2$ over an oxidation catalyst at oxidation catalyst temperatures within an optimum oxidation catalyst temperature range and using a plasma generator to generate $NO_2$ from NO or $N_2$ in the exhaust gas or both at oxidation catalyst temperatures outside of the optimum oxidation catalyst temperature range.

17. A method according to claim 16, wherein the optimum oxidation catalyst temperature range is from about 200° C. to about 400° C.

18. The method of claim 16, wherein the lean burn engine is diesel engine.

19. A system for treating exhaust gases from diesel engines including NO, nitrogen and particulate matter, which system comprising:
 (a) a catalyst for generating $NO_2$ from the NO;
 (b) a plasma generator for generating at least one of: (1) $NO_2$ from the NO or nitrogen or both; and (2) ozone;
 (c) a microprocessor for controlling the plasma generator to operate at exhaust gas temperatures over the oxidation catalyst of > about 400°C.; and
 (d) a filter for trapping a desired proportion of the particulate matter,
wherein trapped particulate matter is combusted by reaction with at least one of $NO_2$ or ozone.

20. A system according to claim 19, wherein the microprocessor further operates during engine conditions which are pre-determined to generate increased amounts of particulate matter.

21. A system according to claim 19, wherein the microprocessor further operates during low exhaust gas temperatures.

22. A system according to claim 21, wherein the microprocessor operates when the exhaust gas temperature over the oxidation catalyst is <200° C.

23. A system according to claim 19, wherein the plasma generator is located upstream of the filter and all or a portion of the exhaust gases from the engine are passed therethrough.

24. A system according to claim 19, wherein the plasma generator is located downstream of the filter and all or a portion of the plasma-treated and filtered exhaust gases are recirculated to the upstream side of the filter.

25. A system according to claim 19, wherein a proportion of the exhaust gases are plasma treated and blended with untreated exhaust gases to create a desired blend of NO and $NO_2$.

26. A system according to claim 19, further comprising means for removing or reducing NOx mounted downstream of the filter and plasma generator.

27. A system according to claim 25, wherein the means for removing or reducing NOx comprises a NOx trap.

28. A system according to claim 25, wherein the means for removing or reducing NOx comprises an SCR system.

29. A system according to claim 19, wherein the plasma generator comprises a piezoelectric device.

30. A system according to claim 19, wherein the microprocessor is comprised in an engine management unit.

31. A method of increasing levels of $NO_2$ in an exhaust system to combust particulate matter trapped on a filter in the system, which system including an oxidation catalyst effective to oxidise NO to $NO_2$ over an optimum oxidation catalyst temperature, which method comprising using a plasma generator to generate additional $NO_2$ from one or both of NO and $N_2$ during engine conditions which are pre-determined to generate increased amounts of particulate matter when the oxidation catalyst temperature is within the optimum oxidation catalyst temperature range.

32. A method according to claim 31, wherein the optimum oxidation catalyst temperature range is from about 200° C. to about 400° C.

33. A system for treating exhaust gases including NO, nitrogen and particulate matter, which system comprising:
 (a) a catalyst for generating $NO_2$ from the NO;
 (b) a plasma generator for generating at least one of: (1) $NO_2$ from the NO or nitrogen or both; and (2) ozone plasma generator; and
 (c) a filter for trapping a desired proportion of the particulate matter, wherein trapped particulate matter is combusted by reaction with at least one of $NO_2$ or ozone and wherein the plasma generator is located downstream of the filter and all or a portion of the plasma-treated and filtered exhaust gases are recirculated to the upstream side of the filter.

34. A system for treating exhaust gases from diesel engines including NO, nitrogen and particulate matter, which system comprising:
 (a) a catalyst for generating $NO_2$ from the NO;
 (b) a plasma generator for generating at least one of: (1) $NO_2$ from the NO or nitrogen or both; and (2) ozone;
 (c) a filter for trapping a desired proportion of the particulate matter, wherein trapped particulate matter is combusted by reaction with at least one of $NO_2$ or ozone and wherein the plasma generator is located downstream of the filter and all or a portion of the plasma-treated and filtered exhaust gases are recirculated to the upstream side of the filter.

35. A system for treating exhaust gases including NO, nitrogen and particulate matter, which system comprising:
 (a) a catalyst for generating $NO_2$ from the NO;
 (b) a plasma generator for generating at least one of: (1) $NO_2$ from the NO or nitrogen or both; and (2) ozone;
 (c) a filter for trapping a desired proportion of the particulate matter; and
 (d) a microprocessor for controlling the plasma generator to operate only at predetermined low and high exhaust gas temperatures,
wherein trapped particulate matter is combusted by reaction with at least one of $NO_2$ or ozone.

* * * * *

UNITED STATES PATENT AND TRADEMARK OFFICE
CERTIFICATE OF CORRECTION

PATENT NO. : 6,775,972 B2
DATED : August 17, 2004
INVENTOR(S) : Martyn Vincent Twigg et al.

It is certified that error appears in the above-identified patent and that said Letters Patent is hereby corrected as shown below:

Title page,
Insert the following:

-- [30]        Foreign Application Priority Data

October 9, 1998     (GB)     United Kingdom ................... 9821947 --
Item [56], References Cited, FOREIGN PATENT DOCUMENTS, insert:

-- WO      98/09699     03/12/1998
  GB       2 270 013    03/02/1994
  GB       2 274 412    07/27/1994 --
OTHER PUBLICATIONS, insert:

-- Mizuno, Akira et al., "Reactive Absorption of NOx Using Wet Discharge Plasma Reactor," IEEE Transactions on Industry Applications, Vol. 31, No. 6, November/December 1995, pp. 1463-1468. --

Signed and Sealed this

Twenty-sixth Day of October, 2004

JON W. DUDAS
*Director of the United States Patent and Trademark Office*